Patented Sept. 5, 1933

1,925,765

UNITED STATES PATENT OFFICE 1,925,765

FOOD PREPARATION

Paul Lindner, Danzig-Oliva, Free City of Danzig

No Drawing. Application January 29, 1930, Serial No. 424,453, and in Germany February 20, 1929

4 Claims. (Cl. 99—11)

My invention relates to improvements in food or food preparations and the process of manufacturing the same, and the object of the improvements is to provide food or food preparations in which the flavouring is preserved for a considerable length of time. With this object in view my invention consists in confining the flavouring within a container such as a capsule or pill adapted to exclude the same from the outer air and to be dissolved when preparing the food.

In carrying out the process for example in connection with the manufacture of pudding powders I fill the flavouring in a capsule of gelatin or another suitable matter impermeable to air, and I add the said capsule to the food or the food preparation. When preparing the food the capsule is boiled together therewith. A capsule of this character can be used only in connection with flavouring which does not contain alcohol. Flavouring containing alcohol may be confined in gelatinized sugar pills. I have found that the capsule or pill perfectly preserves the flavour, and when boiling the food the capsule is dissolved, so that the flavour passes into the food.

An important advantage of my improved food preparation is that the capsule or pill is not immediately dissolved within the water when boiling the same, but that it is dissolved only at the end of the cooking and is vaporized in a less degree as compared to processes in which it is exposed to boiling from the beginning. According to the thickness of the wall of the capsule or the composition of the gelatin the flavouring passes into the food after a greater or smaller length of time. Therefore the said period of time can be regulated at will, and it can be used as a means for measuring the time necessary for cooking the food, the food being cooked only until the capsule has been completely dissolved.

By proper composition of the capsule or by partly filling the same the capsule can be made so that it floats on the food being cooked, so that the cook can observe the same and determine the time of cooking.

The capsule containing the flavouring is filled into the food packing by means of machines now in use, and it does not require additional operations and wages. Within the capsules the aromatic substances can be kept in solid or liquid state.

My improved capsules or pills for flavouring are particularly designed for use in connection with pudding powders and the like. But they may also be used in jams, jellies and other food or food preparations.

The food or food preparation may be in the form of powder or in solid form. In case of solid food I prefer to place the capsule into a hole made therein. When pressing powdered food into a coherent body the capsule can be confined therein while compressing the powder.

I claim:

1. A package of food comprising a body of pudding powder and within the powder an airtight of capsule formed of gelatine and containing aromatic flavoring material, the thickness of the walls of the capsule being such that, when the powder is boiled, the capsule will dissolve and release the flavoring material only after boiling has been continued for a time substantially sufficient to cook the powder.

2. A package of food comprising a body of pudding powder and within the powder an airtight capsule formed of gelatine and containing aromatic flavoring material, the thickness of the walls of the capsule being such that, when the powder is boiled in water, the capsule will dissolve and release the flavoring material only after boiling has been continued for a time substantially sufficient to cook the powder, the quantity of flavoring material being so chosen relative to the size and weight of the capsule that the whole capsule will float in water.

3. A package of flavoring material for pudding powders comprising an air-tight gelatine capsule containing an aromatic flavoring material, the thickness of the walls of said capsule being such that, when the capsule is boiled with pudding powder, the capsule will dissolve and release the flavoring material only after boiling has been continued for a time sufficient to cook the powder.

4. A package of flavoring material for pudding powders comprising an air-tight gelatine capsule containing an aromatic flavoring material, the thickness of the walls of said capsule being such that, when the capsule is boiled with pudding powder, the capsule will dissolve and release the flavoring material only after boiling has been continued for a time sufficient to cook the powder, the quantity of flavoring material being so chosen relative to the size and weight of the capsule that the whole capsule will float in water.

PAUL LINDNER.

CERTIFICATE OF CORRECTION.

Patent No. 1,925,765.  September 5, 1933.

PAUL LINDNER.

It is hereby certified that error appears in the printed specification of the above numbered patent requiring correction as follows: Page 1, line 67, strike out the word "of" first occurrence; and that the said Letters Patent should be read with this correction therein that the same may conform to the record of the case in the Patent Office.

Signed and sealed this 24th day of October, A. D. 1933.

F. M. Hopkins (Seal)  Acting Commissioner of Patents.